US008682063B2

(12) United States Patent
Wang et al.

(10) Patent No.: US 8,682,063 B2
(45) Date of Patent: Mar. 25, 2014

(54) METHODS AND APPARATUS FOR DYNAMIC COLOR FLOW MODELING

(75) Inventors: Jue Wang, Kenmore, WA (US); Xue Bai, Minneapolis, MN (US); Guillermo R. Sapiro, St. Louis Park, MN (US)

(73) Assignee: Adobe Systems Incorporated, San Jose, CA (US)

( * ) Notice: Subject to any disclaimer, the term of this patent is extended or adjusted under 35 U.S.C. 154(b) by 791 days.

(21) Appl. No.: 12/953,650

(22) Filed: Nov. 24, 2010

(65) Prior Publication Data

US 2013/0129205 A1  May 23, 2013

(51) Int. Cl.
*G06K 9/00* (2006.01)
*G06K 9/34* (2006.01)

(52) U.S. Cl.
USPC ............................ 382/164; 382/103; 382/173

(58) Field of Classification Search
None
See application file for complete search history.

(56) References Cited

U.S. PATENT DOCUMENTS

| 2003/0099397 A1* | 5/2003 | Matsugu et al. ............... 382/173 |
| 2007/0064804 A1* | 3/2007 | Paniconi et al. ......... 375/240.16 |
| 2010/0046830 A1 | 2/2010 | Wang et al. |

OTHER PUBLICATIONS

Wang, J., Cohen, M.: Image and video matting: A survey. Foundations and Trends in Computer Graphics and Vision 3 (2007) 97-175.
Wang, J., Bhat, P., Colburn, A., Agrawala, M., Cohen, M.: Interactive video cutout. In: Proc. of ACM SIGGRAPH. (2005).
Li, Y., Sun, J., Shum, H.: Video object cut and paste. In: Proc. ACM SIGGRAPH. (2005) 595-600.
Bai, X., Sapiro, G.: A geodesic framework for fast interactive image and video segmentation and matting. In: Proc. of IEEE ICCV. (2007).
Zivkovic, Z.: Improved adaptive Gaussian mixture model for background subtraction. In: Proc. of ICPR. (2004).
Elgammal, A., Harwood, D., Davis, L.S.: Non-parametric model for background subtraction. In: Proc. of ECCV. (2000) 751-767.
Bai, X., Wang, J., Simons, D., Sapiro, G.: Video snapcut: robust video object cutout using localized classifiers. ACM Trans. Graph. 28 (2009) 1-11.
Price, B., Morse, B., Cohen, S.: Livecut: Learning-based interactive video segmentation by evaluation of multiple propagated cues. In: Proc. of ICCV. (2009).
Sun, J., Zhang, W., Tang, X., Yeung Shum, H.: Background cut. In: Proc. Of ECCV. (2006) 628-641.
Criminisi, A., Cross, G., Blake, A., Kolmogorov, V.: Bilayer segmentation of live video. In: Proc. of CVPR. (2006).
Roth, S., Black, M.J.: On the spatial statistics of optical flow. IJCV 74 (2007) 33-50.
Sun, D., Roth, S., Lewis, J.P., Black, M.J.: Learning optical flow. In: Proc. Of ECCV. (2008) 83-97.
Black, M.J., Yacoob, Y., Jepson, A.D., Fleet, D.J.: Learning parameterized models of image motion. In: Proc. of CVPR. (1997) 561-567.
Simoncelli, E., Adelson, E.H., Heeger, D.J.: Probability distributions of optical flow. In: Proc of CVPR. (1991) 310-315.

(Continued)

*Primary Examiner* — Bernard Krasnic
(74) *Attorney, Agent, or Firm* — Wolfe-SBMC

(57) ABSTRACT

Methods, apparatus, and computer-readable storage media for dynamic color flow modeling. A dynamic color flow model that incorporates motion estimation in a probabilistic fashion is described. By automatically and adaptively changing model parameters based on the inferred local motion uncertainty, the dynamic color flow model accurately and reliably models the object appearance, and improves the foreground color probability estimation when compared to conventional methods. The dynamic color flow model may, for example, be applied to both foreground and background layers (or to additional layers) for video object segmentation, obtaining significantly improved results when compared to conventional methods.

16 Claims, 13 Drawing Sheets

(56) References Cited

OTHER PUBLICATIONS

Bruhn, A., Weickert, J., Schnoorr, C.: Lucas/kanade meets horn/schunck: combining local and global optic flow methods. IJCV 61 (2005) 211-231.

An introduction to kernel density estimation, Seminar notes, Weatherburn Lecture Series for the Department of Mathematics and Statistics, University of Western Australia, author Tarn Duong), May 24, 2001 http://school.maths.uwa.edu.au/~duongt/seminars/intro2kde/.

Irani, M., Anandan, P., Bergen, J.: Efficient representations of video sequences and their applications. Signal Processing: Image Communication 8 (1996) 327-351.

Rav-Acha, A., Pritch, Y., Lischinski, D., Peleg, S.: Dynamosaicing: Mosaicing of dynamic scenes. IEEE Trans. on Pattern Analysis and Machine Intelligence. 29 (2007) 1789-1801.

Bertalmio, M., Sapiro, G., Caselles, V., Ballester, C.: Image inpainting. In: Proc. of ACM SIGGRAPH. (2000) 417-424.

Chuang, Y.Y., Agarwala, A., Curless, B., Salesin, D., Szeliski, R.: Video matting of complex scenes. In: Proc. of ACM SIGGRAPH. (2002) 243-248.

Rother, C., Kolmogorov, V., Blake, A.: Grabcut—interactive foreground extraction using iterated graph cut. In: Proc. of ACM SIGGRAPH. (2004) 309-314.

Boykov, Y., Veksler, O., Zabih, R.: Fast approximate energy minimization via graph cuts. IEEE Trans. on Pattern Analysis and Machine Intelligence 23 (2001) 1222-1239.

\* cited by examiner

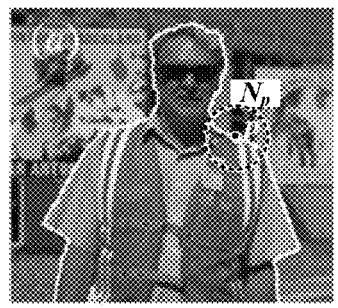
FIG. 6A          FIG. 6B
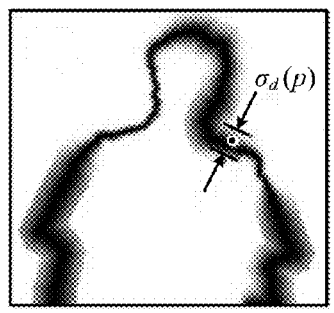
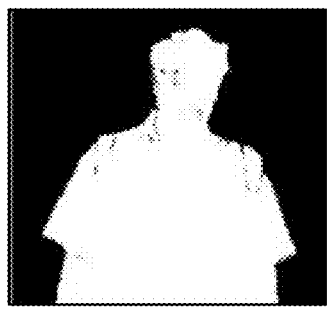
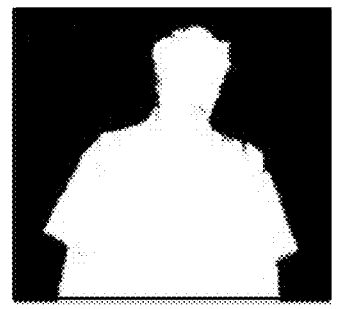
FIG. 6C          FIG. 6D          FIG. 6E

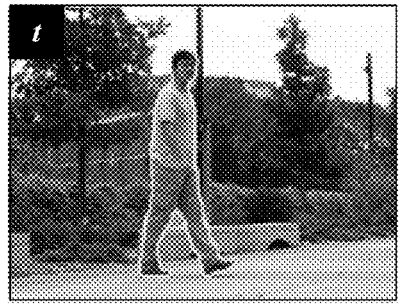 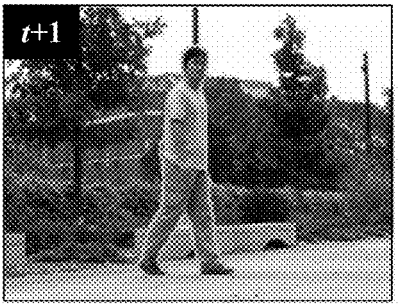 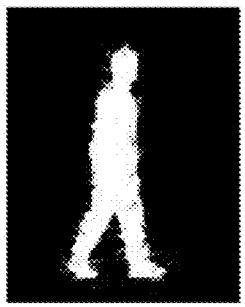
FIG. 8A        FIG. 8B        FIG. 8C
  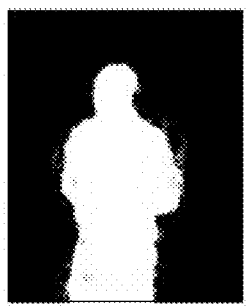
FIG. 9A        FIG. 9B        FIG. 9C
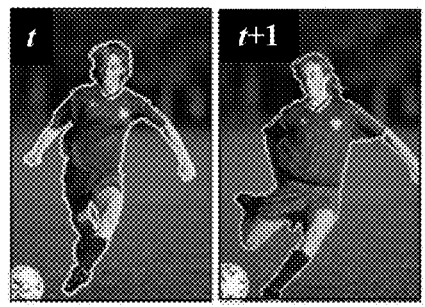  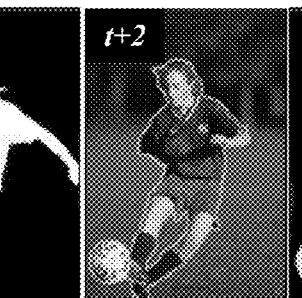 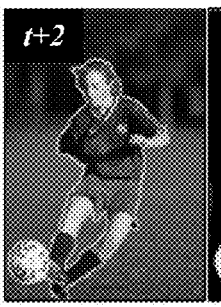 
FIG. 10A   FIG. 10B   FIG. 10C   FIG. 10D   FIG. 10E

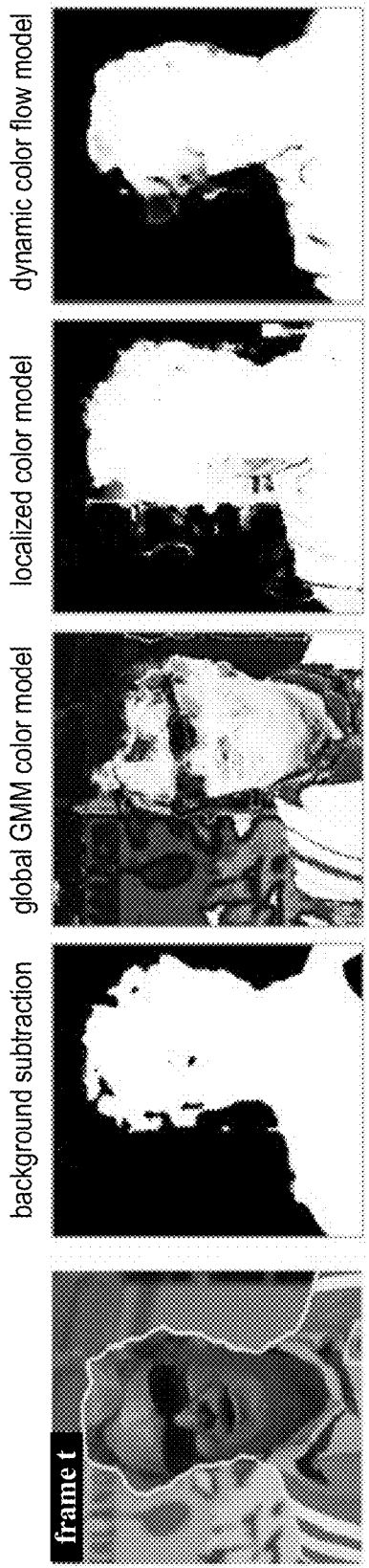
FIG. 11A frame t
FIG. 11B background subtraction
FIG. 11C global GMM color model
FIG. 11D localized color model
FIG. 11E dynamic color flow model
FIG. 11F frame t+1
FIG. 11G background subtraction
FIG. 11H global GMM color model
FIG. 11I localized color model
FIG. 11J dynamic color flow model

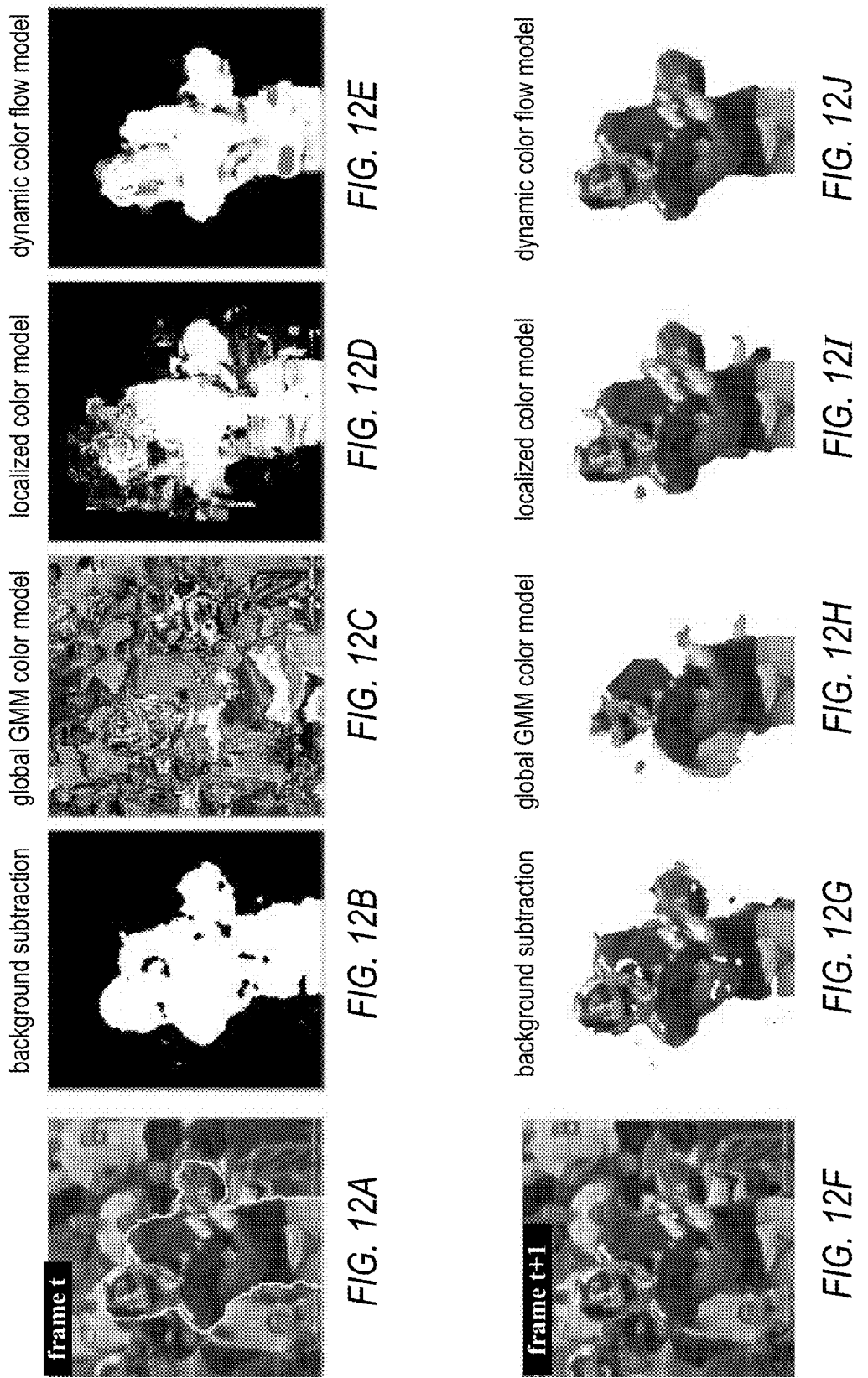

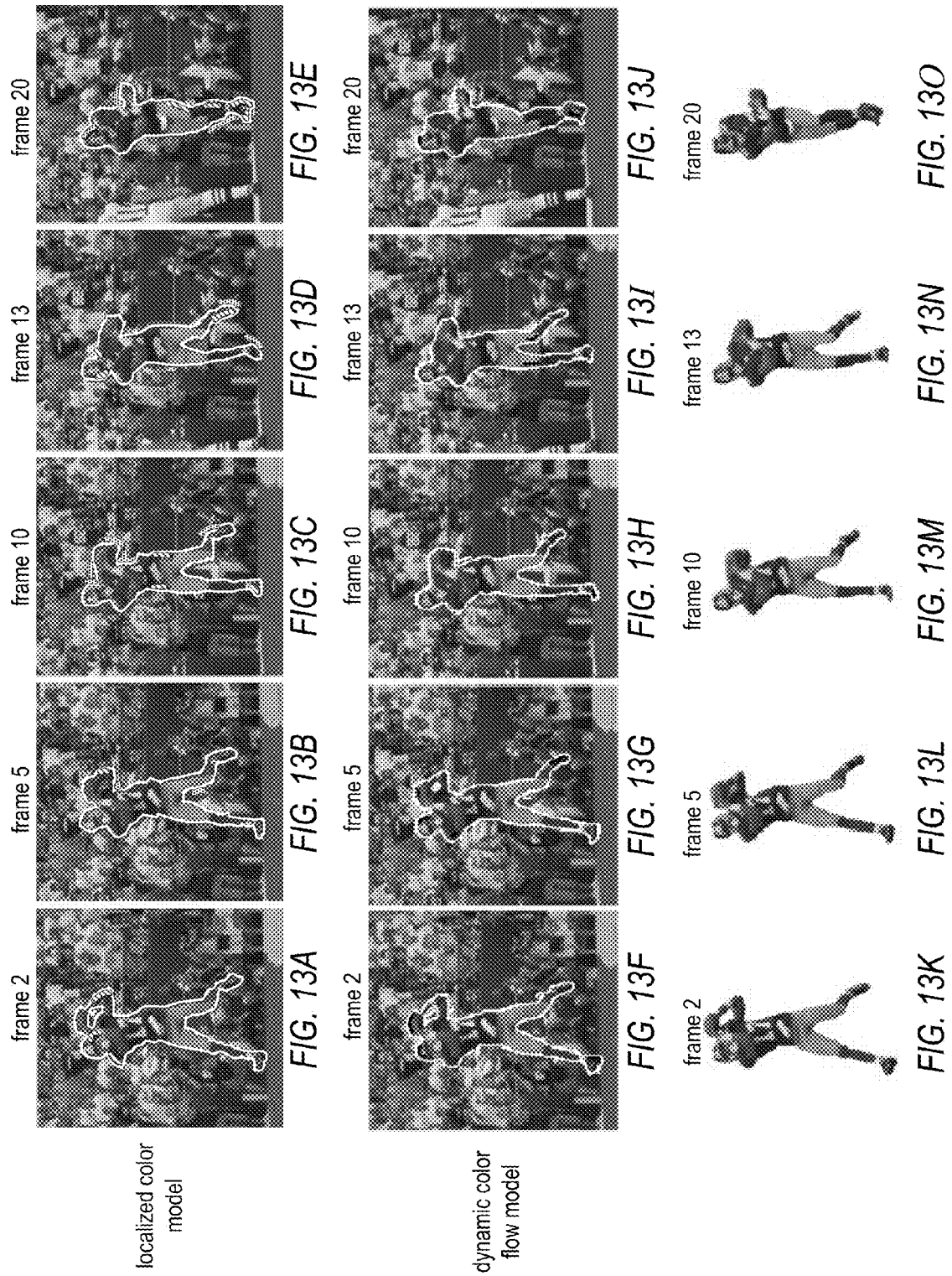

METHODS AND APPARATUS FOR DYNAMIC COLOR FLOW MODELING

BACKGROUND

Description of the Related Art

Creating accurate masks for video objects is a fundamental component in the video post-processing pipeline. Once being accurately segmented from the video, the target objects may be used to create seamless composites, or may be manipulated to create special visual effects. Recently, interactive or user-guided video segmentation systems have gained considerable attention, given the fact that interactive systems may generate more accurate segmentation results than fully automatic ones, on a wide range of videos.

Although significant breakthroughs have been achieved on interactive video segmentation and matting, this problem remains difficult for complex real world video frame sequences. The difficulty comes from two main aspects, namely appearance complexity and motion complexity. Appearance complexity refers to the fact that the targeted object may contain very similar, or even the same colors and features as the background, thus distinguishing the object from its background using color information becomes a hard problem. Note that the object appearance information is not limited to colors; the object appearance may also incorporate other types of features depending on the application. In addition, video objects or backgrounds often exhibit non-uniform motions. Thus, applying an appearance model constructed from a current frame to the next frame may be problematic without correctly adapting the appearance model to the new position of the possibly deforming object/background caused by the motion.

Although various approaches have been proposed to tackle these problems, these approaches either do not employ color models that are powerful enough to handle the appearance complexity, or do not adequately consider the motion complexity when updating the models across frames. As a result, the color models used in previous systems are often too rigid to handle video frame sequences with complex appearance and motion. Even with the help of other priors such as shape, pose, and structure, color is still an important feature in most natural videos, thus inaccurate color modeling often directly leads to segmentation errors. While these errors are correctable in an interactive setting, the user has to provide more manual input, which could be time consuming in many cases.

Color Models

Accurately modeling object colors, and features in general, plays a critical role in video segmentation and analysis. However, commonly used conventional color models such as global Gaussian mixtures, localized Gaussian mixtures, and pixel-wise adaptive ones, often fail to accurately represent the object appearance in complicated scenes, thereby leading to segmentation errors.

Global Color Models.

Some conventional interactive video segmentation systems use global color models, such as the popular choice of global Gaussian mixtures (GMM), to represent the appearance of the dynamic objects. Global color models do not consider the spatial arrangements of color components, thus are robust to object motion. However, the discrimination power of global models is limited when dealing with objects with complicated appearance.

Pixel-Wise Color Models.

Another conventional technique in color modeling is to consider every pixel on the image plane independently. Such a method is often used in background subtraction systems. Assuming the camera is fixed and the background is static, these systems form statistical models at every pixel location to describe the observed background colors. However, using these models requires accurate frame-to-frame alignment, which may not be possible with dynamic background scenes.

Localized Color Models.

Some conventional video segmentation systems employ localized color models. A localized color model consists of a group of spatially constrained color components that are distributed along the object's boundary in an overlapping fashion. Each color component includes a GMM with a fixed spatial domain. When propagated across frames, these local models are first pushed by optical flow vectors to arrive at new destinations, before being applied for local segmentation. By localizing the color models, the foreground object may be modeled more accurately, leading to efficient segmentations. Although in this approach motion estimation is used to move local color models across frames, it is treated independently from color modeling and classification. The scale (spatial domain) of all local color models is fixed without considering the underlying motion. This can cause two problems: when the local motion is strong (like a waving hand), optical flow may lose track, and the fixed window size may be too small to allow the localized color models to capture the object. However, for parts of the object where local motion is small, the window size may become too large to accurately model the foreground to background transition.

Bilayer Segmentation

For live speaker-background segmentation for video conferencing, assuming a stationary background, some conventional background cut systems use a background contrast attenuation method to adaptively suppress the contrasts that belongs to the background, making extracting the foreground easier. Some conventional systems may avoid explicit motion estimation using a second order Hidden Markov Model (HMM) as a temporal (learned) prior on segmentation. These systems may efficiently segment a video in a constrained environment, but are hard to generalize for other types of videos.

Optical Flow Statistical Modeling

There have been some formal studies on modeling the statistics of optical flow. These studies are directed at improving optical flow estimation of natural images by considering learned prior distributions from ground truth training data. In particular, one of these studies was performed on optical flow spatial properties and the brightness constancy error, resulting in a probabilistic model of optical flow. However, the learned statistics in this study are global priors.

SUMMARY

Various embodiments of methods, apparatus, and computer-readable storage media for dynamic color flow modeling are described. Embodiments may employ a dynamic color flow model, for example in a video object segmentation technique or in other video post-production tasks. Unlike conventional approaches, the dynamic color flow model incorporates motion estimation into color modeling in a probabilistic framework, and adaptively changes model parameters to match the local properties of the motion. The dynamic color flow model accurately and reliably describes changes in the scene's appearance caused by motion across frames. In at least some embodiments of a video object segmentation technique, the dynamic color flow color model may be applied to both foreground and background layers in a balanced way for efficient object segmentation in video frame sequences.

In a dynamic color flow modeling method, a region of interest on a frame t may be obtained. For example, the region of interest may be a segmented foreground, background, or some other object on frame t. For each pixel in the region of interest, optical flow relative to a frame t+1 may be computed. In some embodiments, other motion detection algorithms than optical flow may be used. The locally averaged optical flow may be used as a motion vector for the pixel relative to frame t+1. The motion vector for the pixel on frame t may be used in generating a local probability map centered at the predicted pixel location on frame t+1. Variance or "fuzziness" of the local probability map may be determined, for example by the magnitude of the respective motion vector, or by other characteristics or by user input. The local probability map may, for example, be a Gaussian distribution function. In general, a higher magnitude of the motion vector results in a larger "window" (i.e., a local probability map that is more spread out) on frame t+1, while a smaller magnitude results in a smaller window on frame t+1. Colors from the pixels in the region of interest in frame t are then propagated to pixels in a dynamic color flow model for frame t+1 according to the local probability maps. At least one affected pixel in the dynamic color flow model for frame t+1 receives color contributions from two or more pixels in frame t according to the probabilistic distribution of the respective local probability maps. In addition, at least one pixel in frame t contributes color to two or more pixels in the dynamic color flow model for frame t+1.

In a video object segmentation process employing a dynamic color flow modeling method as described herein, a dynamic color flow model may be constructed for both the foreground and the background in a frame t+1 relative to frame t. In at least some embodiments, for at least some video clips, processing the background may involve background reconstruction. In some embodiments, constructing the dynamic color flow model for the background may assume that the background exhibits uniform motion, and thus a uniform value for the variance $\sigma_i$ may be used. However, in some embodiments, variance $\sigma_i$ may be dynamically computed for each background pixel as is done for each foreground pixel. A global color probability map for frame t+1 may be constructed according to the foreground and background dynamic color flow models. A segmentation for frame t+1 may then be generated according to the global color probability map according to a segmentation technique, for example a graph cut segmentation technique. In some embodiments, a shape prior may be derived from the global color probability map and/or the foreground and background dynamic color flow models and used to guide or constrain the segmentation.

Note that the elements of the video object segmentation process may be repeated for each subsequent frame in a video frame sequence, with the segmentation generated for one frame used as the basis for generating the segmentation in the next frame.

BRIEF DESCRIPTION OF THE DRAWINGS

FIGS. 6A through 6E illustrate using shape priors in object segmentation, according to at least some embodiments.

FIGS. 8A-8C, 9A-9C, and 10A-10E show additional examples of segmentation propagation on objects with diverse motion and demonstrate different motion scales, according to at least some embodiments.

FIGS. 11A through 11J and FIGS. 12A through 12J compare color probability maps and segmentation results generated by simple background subtraction, the global GMM color model, a localized color model, and an embodiment of the dynamic color flow model on two examples.

FIGS. 13A through 13O compare results of an interactive video object segmentation system using a localized color model to results of an interactive video object segmentation system using an embodiment of the dynamic color flow model as described herein.

Figure 1:
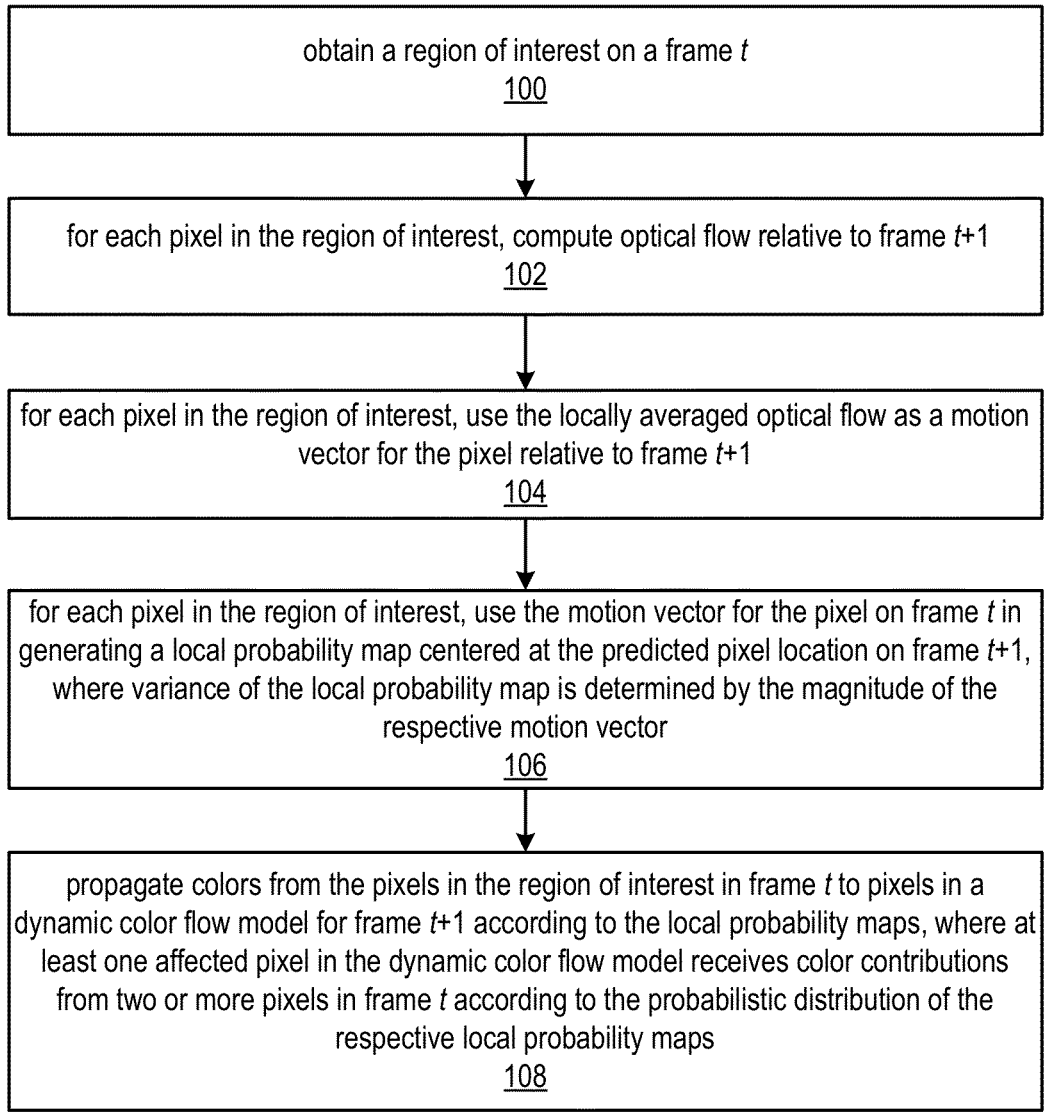
FIG. 1 illustrates a high-level flowchart of a dynamic color flow modeling method, according to at least some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods, apparatus, and computer-readable storage media for dynamic color flow modeling are described. Accurately modeling object colors, and features in general, plays a critical role in video segmentation and analysis, and in other video post-production tasks. Conventional color models often fail to accurately represent the object appearance in complicated scenes, thereby leading to segmentation errors. Embodiments may employ a dynamic color flow model, for example in a video object segmentation technique or in other post-production tasks. Unlike conventional approaches, the dynamic color flow model incorporates motion estimation into color modeling in a probabilistic framework, and adaptively changes model parameters to match the local properties of the motion. The dynamic color flow model accurately and reliably describes changes in the scene's appearance caused by motion across frames. In at least some embodiments of a video object segmentation technique, the dynamic color flow color model may be applied to both foreground and background layers in a balanced way for efficient object segmentation in video frame sequences. Results are provided that show that the dynamic color flow model provides more accurate foreground and background estimations in video object segmentation, leading to a more efficient video object segmentation system when compared to conventional approaches.

In the dynamic color flow model, motion estimation and color modeling are combined into a single probabilistic framework that simultaneously addresses the appearance and motion complexities. Appearance complexity refers to the fact that the targeted object could contain very similar, or even the same colors and features as the background. The object appearance may also incorporate other types of features than colors, for example texture, depending on the application. Motion complexity refers to the fact that video objects or backgrounds may exhibit non-uniform motions.

To combine motion estimation and color modeling into a single probabilistic framework that simultaneously addresses the appearance and motion complexities, embodiments of the dynamic color flow model may automatically and adaptively select a suitable color model, continuously ranging from a global model to a localized model, for different parts of the object or scene so that the color model can be reliably applied to segmenting subsequent frames. The probabilistic framework does not assume accurate motion estimation. In fact, embodiments take into account the estimation errors and only assume the motion estimation to be probabilistic; thus, any motion algorithm with reasonable performance can be embedded into the video object segmentation system. Furthermore, the dynamic color flow model may be applied to both foreground and background layers, leading to an efficient video object segmentation system.

There have been some formal studies on modeling the statistics of optical flow. However, these studies are directed at improving optical flow estimation of natural images by considering learned prior distributions from ground truth training data. In contrast, embodiments of the dynamic color flow model as described herein employ probabilistic methods on existing optical flow results for the purpose of generating more accurate color models for segmentation. In particular, one of these studies was performed on optical flow spatial properties and the brightness constancy error, resulting in a probabilistic model of optical flow. However, the learned statistics in this study are global priors. In contrast, embodiments of the dynamic color flow model allow the distribution to be defined for individual pixels depending on the local motion.

Embodiments of the dynamic color model may work with any optical flow algorithm that has reasonable performance. In some embodiments, the Gaussian functions used for distribution as described herein may be replaced by other, possibly more accurate, distribution functions.

Figure 14:
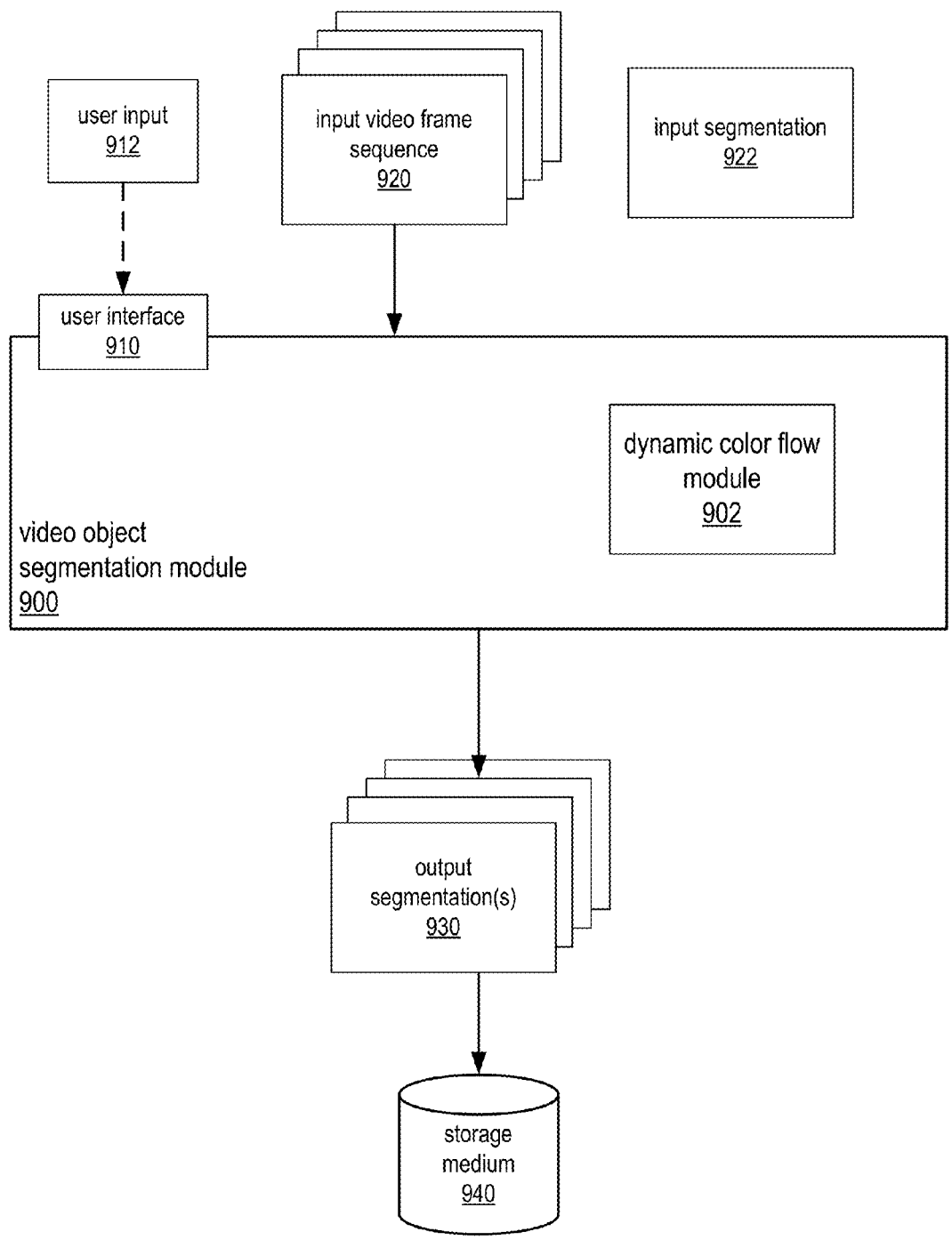
FIG. 14 illustrates a video object segmentation module that may implement a dynamic color flow modeling method, according to at least some embodiments.

Embodiments of the dynamic color flow model as described herein may, for example, be implemented in a video object segmentation module implemented by program instructions stored in a computer-readable storage medium and executable by one or more processors (e.g., one or more CPUs and/or GPUs). In at least some embodiments, the video object segmentation module may implement an interactive, user-guided video object segmentation technique in which the video object segmentation process may be guided by user input, for example a user-segmented key frame as a starting segmented frame and/or user strokes or scribbles that are used to indicate regions of foreground or background that are incorrectly segmented. Embodiments of the video object segmentation module may, for example, be implemented as a stand-alone application, as a module of an application, as a plug-in for applications including image processing applications, and/or as a library function or functions that may be called by other applications such as image processing applications. Embodiments of the video object segmentation module may be implemented in any image processing application, including but not limited to Adobe® PhotoShop® and Adobe® After Effects®. "Adobe", "Photoshop", and "After Effects" are either registered trademarks or trademarks of Adobe Systems Incorporated in the United States and/or other countries. An example video object segmentation module that may implement the methods for dynamic color flow modeling as described herein is illustrated in FIG. 14. An example system on which a video object segmentation module may be implemented is illustrated in FIG. 15.

Figure 15:
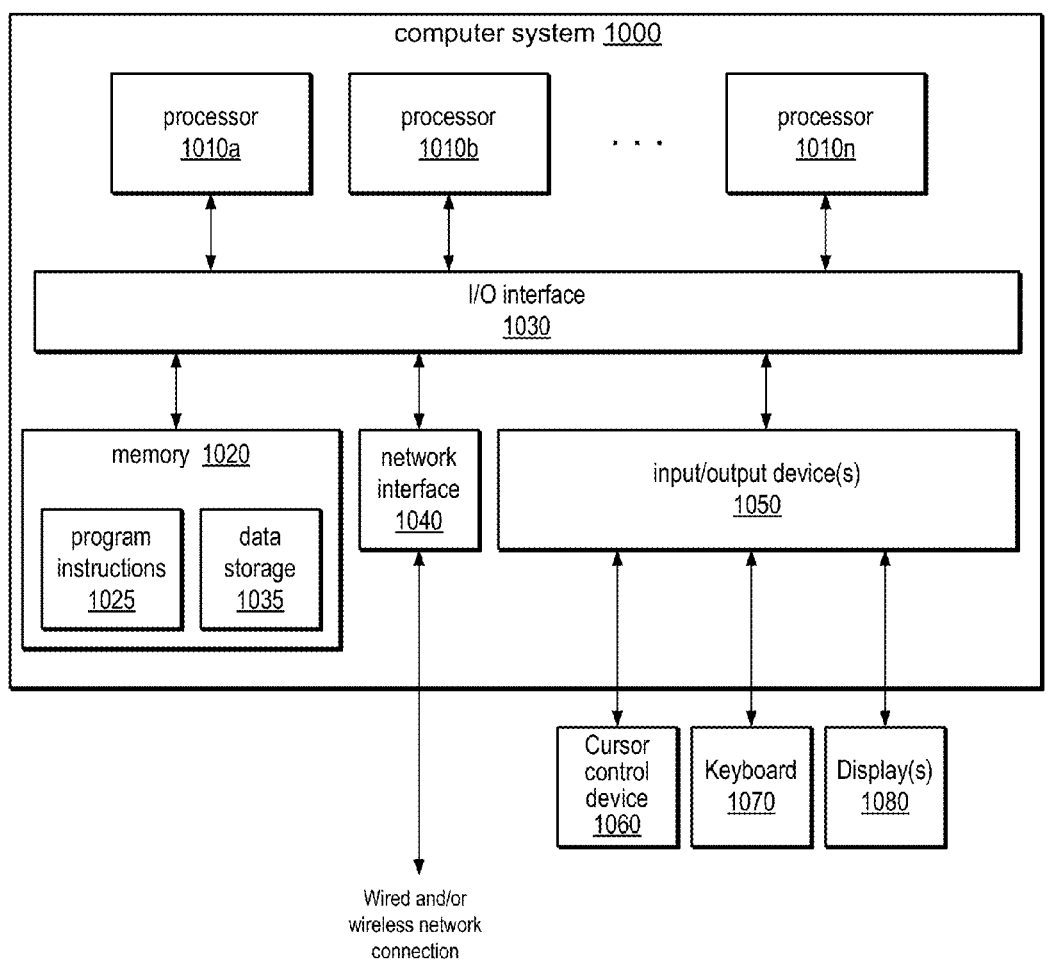
FIG. 15 illustrates an example computer system that may be used in embodiments.

In addition, embodiments of the dynamic color flow model as described herein may be implemented as a dynamic color flow model module implemented by program instructions stored in a computer-readable storage medium and executable by one or more processors (e.g., one or more CPUs and/or GPUs), for example as shown in FIG. 15. The dynamic color flow module may, for example, be a module of an application, a plug-in for applications including image processing applications, and/or a library function or functions that may be called by other applications such as image processing applications.

While embodiments of the dynamic color flow model are generally described in relation to video object segmentation techniques, the dynamic color flow model may be applied in various other video post-production tasks, and more generally in various other image processing tasks.

Dynamic Color Flow Model

This section describes embodiments of the dynamic color flow model, putting aside the overall interactive video object segmentation workflow, which will be described later, and focusing on the fundamental problem of segmentation propagation: given a known correct foreground/background segmentation on frame t, how to use the segmentation on frame t to build accurate color models for segmenting the foreground/background on frame t+1. Note that this section does not distinguish between foreground and background; a later section will describe methods for applying the dynamic color flow model to both foreground and background regions.

Segmentation is trivial if an accurate motion vector field between frames is available: for every pixel on frame t+1, the pixel may be traced back to the previous frame to determine whether it comes from the region of interest or not. However, a perfect motion vector field is almost impossible to compute in the real world, and directly using it for segmentation will be erroneous. Embodiments of the dynamic color flow model explicitly model the motion inaccuracy, and provide a probabilistic framework unifying the local colors of the object and their dynamic motion. In this section, first, a general, high-level flowchart for a dynamic color flow model method will be described. Then, a more detailed description of embodiments of the dynamic color flow model will be provided.

Dynamic Color Flow Model Flowchart

FIG. 1 illustrates a high-level flowchart of a dynamic color flow modeling method, according to at least some embodiments. As indicated at 100, a region of interest on a frame t may be obtained. For example, the region of interest may be a segmented foreground, background, or some other object on frame t. As indicated at 102, for each pixel in the region of interest, optical flow relative to a frame t+1 may be computed. In some embodiments, other motion detection algorithms than optical flow may be used. As indicated at 104, for each pixel in the region of interest, the locally averaged optical flow may be used as a motion vector for the pixel relative to frame t+1. As indicated at 106, for each pixel in the region of interest, the motion vector for the pixel on frame t may be used in generating a local probability map centered at the predicted pixel location on frame t+1. Variance or "fuzziness" of the local probability map may be determined. In some embodiments, variance may be determined by the magnitude of the respective motion vector. In other embodiments, variance may be determined by other characteristics or metrics, or may be by user input. The local probability map may, for example, be a Gaussian distribution function (see, e.g., equation 1). In general, a higher magnitude of the motion vector results in a larger "window" (i.e., a local probability map that is more spread out) on frame t+1, while a smaller magnitude results in a smaller window on frame t+1. (See, for example, FIG. 4D). As indicated at 108, colors from the pixels in the region of interest in frame t are propagated to pixels in a dynamic color flow model for frame t+1 according to the local probability maps. At least one affected pixel in the dynamic color flow model for frame t+1 receives color contributions from two or more pixels in frame t according to the probabilistic distribution of the respective local probability maps. In addition, at least one pixel in frame t contributes color to two or more pixels in the dynamic color flow model for frame t+1.

Figure 2:
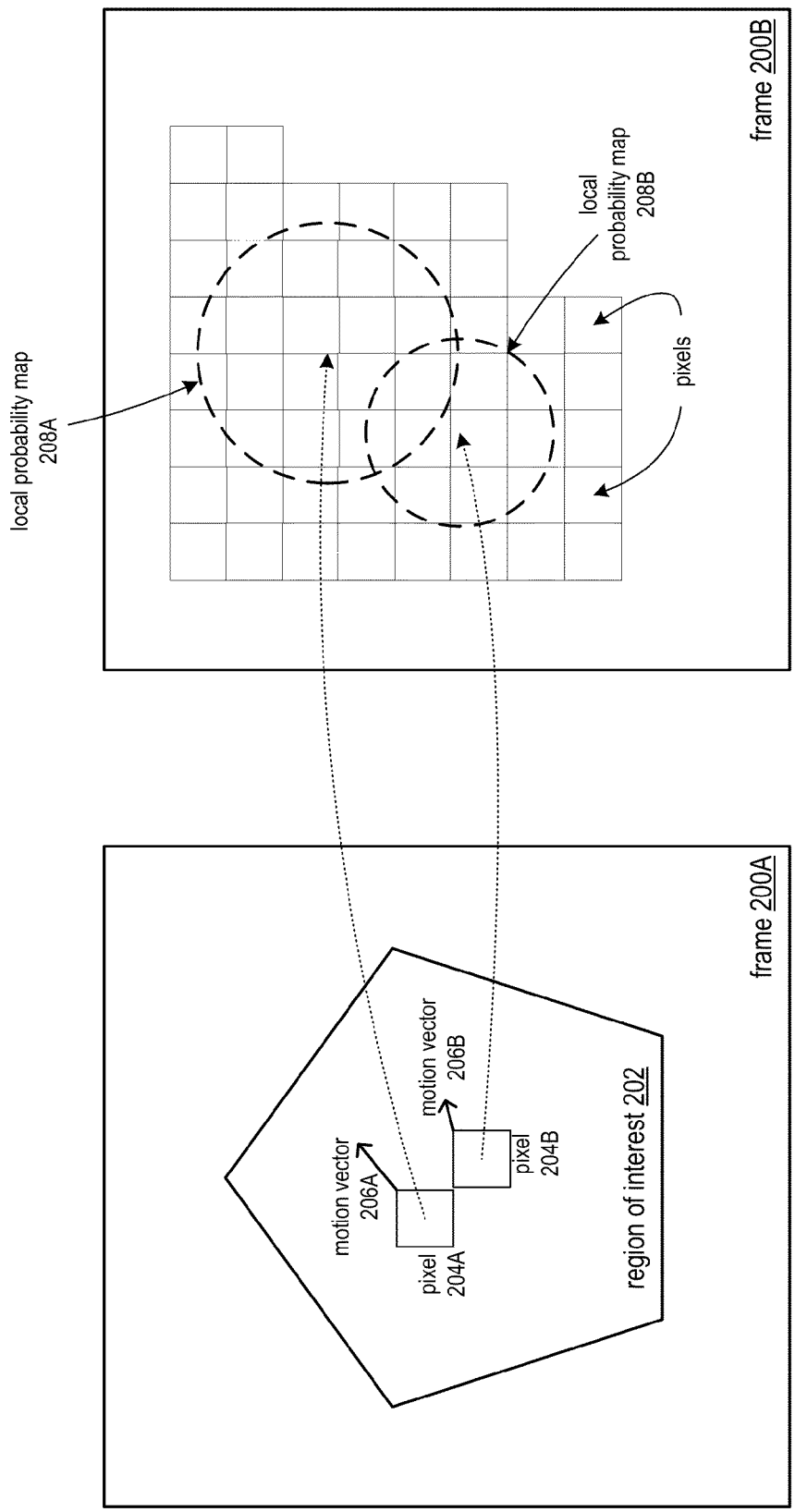
FIG. 2 graphically illustrates local probability maps of the dynamic color flow model according to at least some embodiments.

FIG. 2 graphically illustrates local probability maps of the dynamic color flow model according to at least some embodiments. A frame 200A includes a region of interest 202, e.g. a predetermined segmentation to be propagated to a next frame 200B. For simplicity, two pixels are shown in the region of interest 202, pixels 204A and 204B. A motion vector is determined for each pixel in the region of interest 202. The motion vectors 206A and 206B for pixels 204A and 204B, respectively, are shown. Local probability maps for each pixel in the region of interest 202 are generated; the motion vector for each pixel is used in determining the variance of (and thus the size of) the respective local probability map. In FIG. 2, local probability map 208A corresponds to pixel 204A, and local probability map 208B corresponds to pixel 204B. (The dotted lines point to the predicted location of the pixels in frame 200B.) Note that, since the magnitude of the motion vector 206A is larger than the magnitude of the motion vector 206B, local probability map 208A is larger than local probability map 208B. Also note that the two local probability maps overlap; thus, the pixels respective to frame 200B that are covered by both local probability maps will receive color contributions from both pixels 204A and 204B in frame 200A. Also note that both pixels 204A and 204B contribute color to more than one pixel respective to frame 200B according to their respective local probability maps.

Dynamic Color Flow Model Details

Let $\Omega$ be the region of interest on frame t ($\Omega$ can be foreground F, background B, or some other object in case of multiple objects). The region of interest $\Omega$ contains $|\Omega|$ pixels $X_i$ ($i=1, 2, \ldots, |\Omega|$). The position of pixel $X_i$ is denoted as $x_i$. For each pixel $X_i$ inside $\Omega$, the locally-averaged optical flow v is used as the motion vector to predict its position in frame t+1, $x_i'=x_i+v$. (In at least some embodiments, optical flow vectors may be averaged locally to remove noise.) Assuming the motion vector $x_i'$ is not accurate enough, instead of using $x_i'$ deterministically, $x_i'$ is treated as the center of a Gaussian distribution, $$f_i(y) = \frac{1}{\sqrt{2\pi}\,\sigma_i} \exp\left(-\frac{\|y - x_i'\|^2}{2\sigma_i^2}\right), \tag{1}$$

where y is a location in frame t+1. The variance $\sigma_i$ measures the fuzziness of the prediction. The value of $\sigma_i$ may be dynamically set for each pixel, as will be explained in the next section.

Let $c_{X_i}$ be the color vector of pixel $X_i$. The probabilistic prediction propagates the colors in $\Omega$ to the next frame and generates a distribution $p(c, y|\Omega)$, the probability of observing the color c at location y on frame t+1 given that all colors come from $\Omega$ on frame t. The conditional color distribution at y is:

$$p(c \mid y, \Omega) = \frac{p(c, y \mid \Omega)}{p(y \mid \Omega)}, \tag{2}$$

where $$p(y|\Omega) = \sum_{i=1}^{|\Omega|} p(X_i) p(y|x_i)$$

is a spatial term independent of color, so it can be treated as a normalization constant. Since $p(c, y|\Omega)$ is contributed by all pixels in $\Omega$, it can be written as:

$$p(c, y \mid \Omega) = \sum_{i=1}^{|\Omega|} p(X_i) p(c, y \mid X_i). \quad (3)$$

Since the predicted position of $X_i$ is independent of its color, $$p(c, y \mid X_i) = p(c \mid c_{X_i}) p(y \mid x_i). \quad (4)$$

This results in:

$$p(c \mid y, \Omega) = \frac{\sum_{i=1}^{|\Omega|} p(X_i) p(c \mid c_{X_i}) p(y \mid x_i)}{p(y \mid \Omega)}, \quad (5)$$

where $p(c \mid c_{X_i})$ is the probability of observing color c on frame t+1 given the existence of $c_{X_i}$ on frame t. Given the fact that colors of the same object may vary across frames due to illumination changes, compression, and noise, this may be modeled as a three-dimensional (3-D) Gaussian distribution with mean vector $c_{X_i}$ and covariance matrix $\Sigma$, i.e.:

$$p(c \mid c_{X_i}) = N(c \mid c_{X_i}, \Sigma).$$

The explicit computation will be described later.

As previously defined, $p(y \mid x_i) = f_i(y)$. Assuming equal priors for every pixel, $p(x_i) = 1/|\Omega|$, then:

$$p(c \mid y, \Omega) \propto \sum_{i=1}^{|\Omega|} f_i(y) N\left(c \mid c_{X_i}, \sum\right). \quad (6)$$

From equation (6) it is clear that $p(c \mid y, \Omega)$ can be interpreted as a non-parametric density estimation of the color sample set $\{c_{X_i} \mid i=1, 2, \ldots, |\Omega|\}$. Each sample $c_{X_i}$ is weighted by $f_i(y)$, which is the probability of $c_{X_i}$ arriving at y. It may be observed that the color sample set encodes the motion estimation of the color samples across video frames; thus, the model inherently fuses motion and appearance into a unified framework.

Directly estimating $p(c \mid y, \Omega)$ for each pixel location on frame t+1 is computationally expensive; therefore, at least some embodiments may employ the following approximations to efficiently speed up the computation. First, in some embodiments, the Luv color space may be used, while assuming class-conditional independence of the three channels. The Luv color space, also known as the L*U*V* or L*, u*, v* color space, is a perceptually uniform color space used in computer graphics. Note that class-conditional independence is a weaker assumption than feature independence. Thus, $p(c \mid y, \Omega)$ can be estimated as the product of three one-dimensional (1-D) probability density functions (PDFs) rather than a 3-D PDF, and the covariance matrix $\Sigma$ in equation (6) can be computed in each channel. Note that, in some embodiments, other color spaces, such as RGB, Lab, and HSV (hue, saturation, value), or other representations for multi-valued data, may be used. In a second technique to speed up computation that may be used in some embodiments, the 1-D PDFs at every y location may be incrementally built using a quantized histogram containing 32 bins (other numbers of bins may be used). Denoting the L-channel histogram at y as $H_y^L$, when propagating $X_i$, the L component of $c_{X_i}$ with weight $f_i(y)$, is added to $H_y^L$ for every y that is within a neighborhood centered at $x_i'$ with a radius of $R = 4\sigma_i$. A truncated Gaussian may then be used to replace the Gaussian function in equation (1).

After propagating all pixels within $\Omega$, 1-D kernel density estimation may be applied on every histogram. Now, let $\overline{H}_y^L$ be the estimated density for the L channel at y (the u and v channels are similarly computed). Also, let the color at y in frame t+1 be denoted as $c_y = \{l, u, v\}$. Finally, the probability of $c_y$ coming from $\Omega$ is:

$$p(c_y \mid y, \Omega) = \overline{H}_y^L(l) \cdot \overline{H}_y^u(u) \cdot \overline{H}_y^v(v) \quad (7)$$

This procedure computes the probability for every pixel in the next frame t+1 once the parameters $\sigma_i$ are given. Next, it is shown that the model adaptively changes scales by using different $\sigma_i$-s.

Global Color Model.

When all the $\sigma_i \to \infty$, all color samples are equally weighted, thus generating identical color distribution at each location, which is equivalent to a global color model. As previously mentioned, this global color model only works well when the object has distinct colors from the rest of the scene and is not affected by large motions which are hard to track.

Localized Classifier.

Setting all $\sigma_i$-s to the same value r, a set of moving localized classifiers may be obtained. This model assumes the object can be tracked reasonably well, i.e., the tracking error is less than 4r.

Stationary Pixel-Wise Model.

When $\sigma_i \approx 0$, pixel-wise color models such as are commonly used in conventional background subtraction systems are obtained. This model may be used if the video background is still, or if an accurate alignment can be achieved.

Dynamic Color Model.

In all the above cases, the motion scales of different parts of the object are assumed to be the same. However, most real world examples are likely to contain motions of mixed scales. For instance, for a walking person, his/her hand or foot motion generally has a larger motion scale than his/her body. Thus, by dynamically determining $\sigma_i$ for every pixel, the dynamic color flow model offers the flexibility to adapt to different motion scales, even on the same object.

The next section describes applying the dynamic color flow model in video object segmentation. In that section, methods for computing a in the dynamic color flow model are described.

Dynamic Color Flow for Video Object Segmentation

In this section, the dynamic color flow model is applied to user-guided video object segmentation. It may be assumed that the video frames contain two independent foreground (F) and background (B) layers, although there is no fundamental limit on extending the dynamic color flow model to multiple layers. In at least some embodiments, as described, the dynamic color flow model may be applied to both F and B layers to provide a balanced modeling. The segmentation may then be solved, for example within a Markov Random Field (MRF) framework. In this section, first, a general, high-level flowchart for video object segmentation process employing a dynamic color flow model will be described. Then, a more detailed description of the video object segmentation process will be provided.

Video Object Segmentation Process Flowchart

Figure 3:
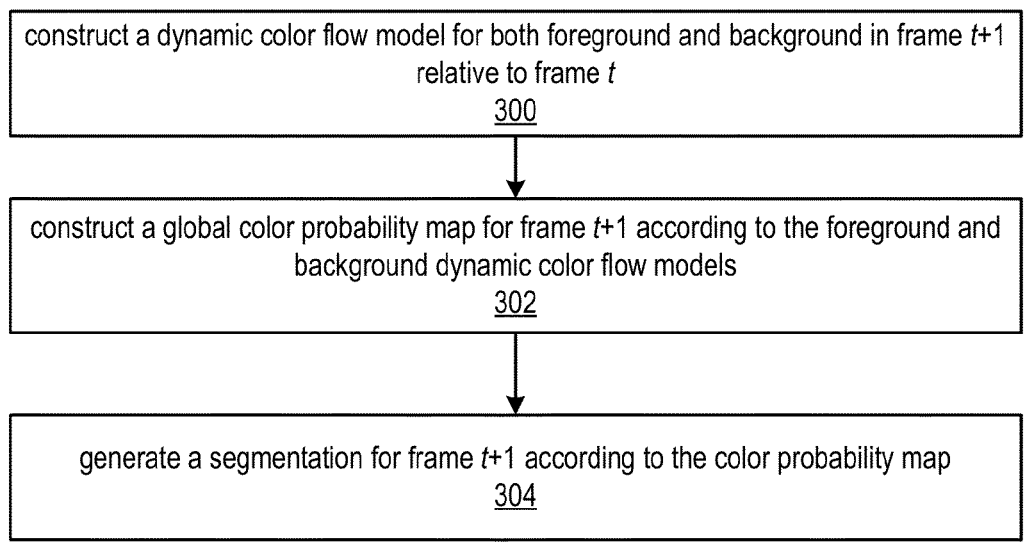
FIG. 3 is a high-level flowchart of a video object segmentation process employing a dynamic color flow modeling method as described herein, according to at least some embodiments.

FIG. 3 is a high-level flowchart of a video object segmentation process employing a dynamic color flow modeling method as described herein, according to at least some embodiments. As indicated at 300, a dynamic color flow model may be constructed for both the foreground and the background in a frame t+1 relative to frame t. Methods for constructing the dynamic color flow model(s) are described above, for example in FIG. 1. In at least some embodiments, for at least some video clips, processing the background may involve background reconstruction, for example as described later in this document. In some embodiments, constructing the dynamic color flow model for the background may assume that the background exhibits uniform motion, and thus a uniform value for the variance $\sigma_i$ may be used. However, in some embodiments, variance $\sigma_i$ may be dynamically computed for each background pixel as is done for each foreground pixel. As indicated at 302 of FIG. 3, a global color probability map for frame t+1 may be constructed according to the foreground and background dynamic color flow models. As indicated at 304, a segmentation for frame t+1 may then be generated according to the global color probability map according to a segmentation technique, for example a graph cut segmentation technique. In some embodiments, a shape prior may be derived from the global color probability map and/or the foreground and background dynamic color flow models and used to guide or constrain the segmentation, as further described later in this document.

Note that the elements of the flowchart in FIG. 3 may be repeated for each subsequent frame in a video frame sequence, with the segmentation generated for one frame used as the basis for generating the segmentation in the next frame.

Video Object Segmentation Process Details

The following provides a more detailed description of a video object segmentation process employing a dynamic color flow model, according to at least some embodiments.

The Foreground Layer

The foreground object general presents various local motion scales. Variance $\sigma_i$, by its definition (see equation (1)), is related to the prediction error of the foreground optical flow. In embodiments, for erratic movement where the optical flow is likely to contain large errors, a may be set to large values; for slow or stable motion, the optical flow is generally more reliable, and thus the value of $\sigma_i$ may be reduced, yielding more localized color models that have greater classification power. In this way, in embodiments, $\sigma_i$ changes adaptively with the prediction error for the different parts of the object.

Figure 4A:
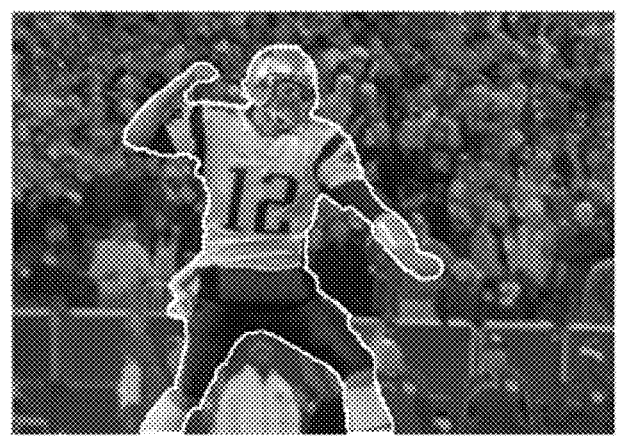
FIGS. 4A through 4D illustrate dynamically generating variable color distributions according to the dynamic color flow modeling method, according to at least some embodiments.
Figure 4B:
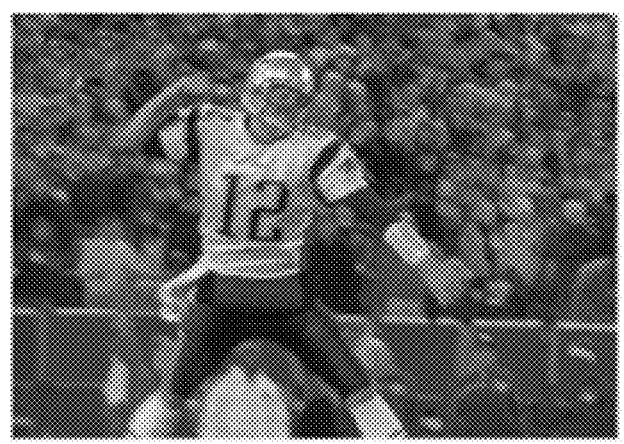
Figure 4C:
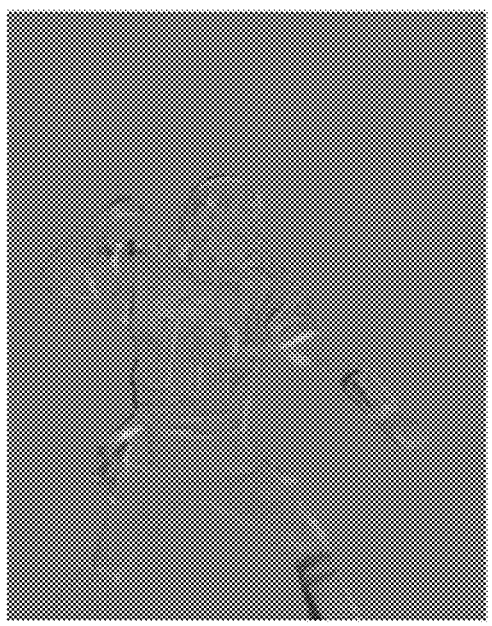
Figure 4D:
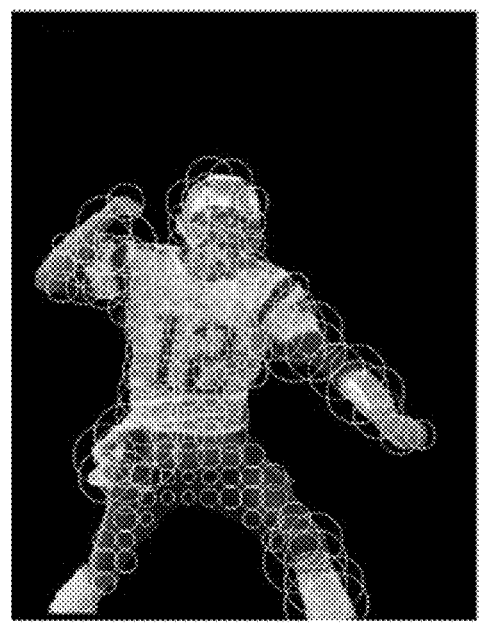

To compute the prediction error, the key frame is warped by the (locally averaged) optical flow to align with the next frame. The alignment error e(x) may be defined as the local average of frames difference, $$e(x) = \sqrt{\frac{1}{m} \sum_{x \in N_x \cap \Omega_F'} \|I_t'(x) - I_{t+1}(x)\|^2},$$

where $N_x$ is a square neighborhood centered at x, $I_t'$ and $\Omega_F'$ are the warped color image and the binary foreground map from frame t to t+1 respectively, and m is the number of foreground pixels in $N_x$. Accurate alignment generally indicates reliable optical flow in the local regions, thus $\sigma_i$ may be defined linearly proportional to e(x). In at least some embodiments, for flat, textureless regions where the local alignment error is small, a lower bound term $\sigma_{min}$ may be added to increase robustness. Defining the local smoothness as:

$$s(x) = \frac{1}{1 + \beta \cdot \bar{g}(x)},$$

where $$\bar{g}(x) = \sqrt{\frac{1}{m} \sum_{x \in N_x \cap \Omega_F'} |\nabla I_\sigma(x)|^2}$$

is the local average of image gradient, and $I_\sigma = I_t' * G_\sigma$, the following is computed:

$$\sigma_i = \begin{cases} \alpha \cdot e(x_i') + s(x_i') \cdot \sigma_{min}, & e(x_i') \le e_{max}, \\ \alpha \cdot e_{max}, & e(x_i') > e_{max}, \end{cases} \quad (8)$$

where $\alpha \cdot e_{max}$ is the upper bound of $\sigma_i$. In some embodiments, $\alpha=0.2$, $\beta=10$, $e_{max}=50$, and $\sigma_{min}=4$. This definition may lead to improved results over conventional fixed $\sigma_i$ color models as shown below (see, for example, FIGS. 11A through 11J). In addition, this method is general and thus may adopt more sophisticated estimations of $\sigma_i$. Compared to a conventional localized color model method where the colors are sampled within windows of a constant size, embodiments of the dynamic color flow model use a flexible sampling range that generates more accurate local color distributions than conventional methods. An example is shown in FIGS. 4A through 4D, where it can be seen how a, changes based on local motion estimation errors. FIG. 4A shows frame t with known segmentation (the white contour). FIG. 4B shows frame t+1. FIG. 4C shows the difference image between the warped frame t and frame t+1. FIG. 4D shows values of $\sigma_i$ (white circles) adapting to the local average intensity, shown in FIG. 4C, across the object, according to embodiments of the dynamic color flow model. Note that values of $\sigma_i$ tend to be smaller on portions of the object (in this example, the football player) with less motion (e.g., the trunk and thighs) and larger on portions of the object with more motion (e.g., the arms, esp. the left arm, the left calf, and the upper portion of the head).

The Background Layer

In at least some embodiments, the background layer may be treated in essentially the same fashion as the foreground layer. However, the occluded background behind the object is missing in frame t, and thus background reconstruction may be required. In this section, two example scenarios and methods to reconstruct the missing background are described. Note that embodiments of the video segmentation system are not limited to these two methods, and more complicated video mosaicking, hole filling algorithms, or other methods may be employed to provide more accurate background reconstruction.

Clean Plate Background Reconstruction

In at least some embodiments, for videos that present a shot of the scene without the object(s) present (i.e., a "clean plate"), the clean plate may be directly used to build the background model. To deal with moving cameras, at least some embodiments may estimate a homography, for example by scale-invariant feature transform (SIFT) matching and RANdom SAmple Consensus (RANSAC) filtering or by some other technique, and then project the clean plate onto the current frame to be segmented. Similar to the foreground modeling, the dynamic color flow model may be applied to the reconstructed clean plate, except that variance $\sigma_i$ is fixed for every background pixel (under the assumption that background motion is minimal and uniform). In some embodiments, for a static background, $\sigma_i$ may be set, for example to [2, 4], to compensate for small alignment errors.

Progressive Background Completion

Figure 5D:
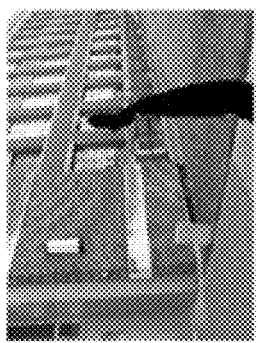
FIGS. 5A through 5F illustrate background reconstruction, according to at least some embodiments.
Figure 5F:
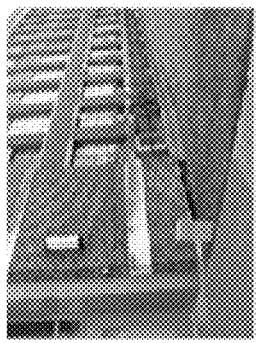
Figure 5C:
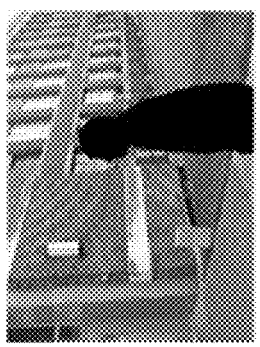
Figure 5E:
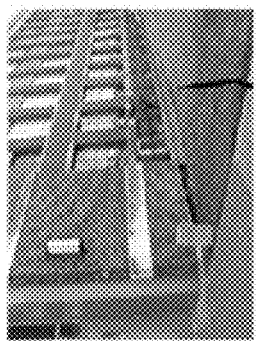
Figure 5B:
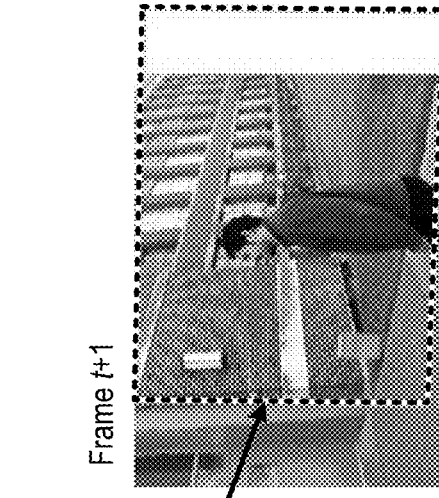
Figure 5A:

In at least some embodiments, if a clean plate is not available, a progressive background completion method may be used. Suppose the first t frames have been segmented; the segmented backgrounds are projected onto frame t+1 in a reverse order, from frame t to frame 1, recovering as much occluded background as possible. In general, if the foreground object has a large relative motion against the background, a dynamic background plate can be recovered as the segmentation process evolves. An example is shown in FIGS. 5A through 5F. Consider that all the frames i prior to frame t+1 have been segmented. As shown in FIGS. 5A and 5B, a frame t with known background may be warped to frame t+1 (working frame) using homography. In FIGS. 5C through 5F, as additional prior frames are projected, the background is gradually completed, and FIG. 5F may then be used as the background layer for frame t+1.

Constructing a Probability Map

Once the dynamic color flow model is constructed for both the foreground and background layers, the foreground probability of a pixel y may be computed as:

$$p^C(y) = \frac{p(c_y \mid y, F)}{p(c_y \mid y, F) + p(c_y \mid y, B)}, y \in I_{t+1}. \quad (9)$$

Constructing an accurate probability map is the key to achieving accurate object segmentation. Compared with conventional color models used in conventional video segmentation systems, the dynamic color flow model produces more accurate results, thanks to the motion adaptive local scale and improved background modeling. In FIGS. 11A through 11J, the color probability maps generated using an implementation of the dynamic color flow method are compared to color probability maps generated using simple background subtraction, global Gaussian mixture color models (GMM), and a conventional method that employs localized color models. The testing was performed on difficult examples where foreground and background color distributions are highly overlapping, and the backgrounds are highly cluttered.

Segmentation with Shape Priors

Directly feeding the color probability map generated by equation (9) to a graph cut optimization may still result in some small segmentation errors, since the color probability map tends to be noisy. To further improve the segmentation, at least some embodiments may incorporate dynamic and local shape priors. The basic idea is to create a variable bandwidth contour adaptive to the local statistics of the dynamic color flow model.

Let p be a point on the object contour (warped from the previous frame), and let $N_p$ be a neighborhood centered at p. The distance between two histograms may be defined as:

$$d_H(\overline{H}_1, \overline{H}_2) := 1 - \Sigma_i \min\{\overline{H}_1(i), \overline{H}_2(i)\}.$$

Let:

$$\overline{H}_{F,y}^L, \overline{H}_{F,y}^u, \overline{H}_{F,y}^v,$$

be the three foreground color histograms at a pixel y, and let:

$$\overline{H}_{B,y}^L, \overline{H}_{B,y}^u, \overline{H}_{B,y}^v,$$

be the corresponding background color histograms at y. Then, the following may be defined:

$$D(y) := \min\{d_H(\overline{H}_{F,y}^L, \overline{H}_{B,y}^L), d_H(\overline{H}_{F,y}^u, \overline{H}_{B,y}^u), d_H(\overline{H}_{F,y}^v, \overline{H}_{B,y}^v)\} \quad (10)$$

and for added robustness, consider:

$$\overline{D}(p) := \frac{1}{K} \sum_{y \in N_p} D_y,$$

where K is the number of pixels in $N_p$. The local shape profile is:

$$p^S(y) = 1 - N(d_y \mid \sigma_d).$$

$N(d_y \mid \sigma_d)$ is a Gaussian distribution with variance $\sigma_d$, which is linearly proportional to $\overline{D}(p)$, and $d_y$ is the Euclidean distance from y to the contour point p. Larger $\overline{D}(p)$ indicates that the local foreground and background colors are more separable; thus, a wider shape profile may be used to give less spatial constraint, and a narrower shape profile may be used to give more spatial constraint. Finally, the integrated probability at y, combining both local shape and color models, may be defined as:

$$p(y) = p^C(y)(1 - p^S(y)) + M_{t+1}'(y) p^S(y) \quad (11)$$

where $M_{t+1}'$ is the warped object mask with 1 inside the mask and 0 outside the mask. Essentially, $p^S(y)$ is used as a weight to linearly combine the color probability $p^C(y)$ with the warped object mask $M_{t+1}'$. An example is shown in FIGS. 6A through 6E. The shape prior is a variable bandwidth border around the warped object contour (white curve in FIG. 6A). In FIG. 6A, for every point p on the contour, the average of histogram distance D(p) in the neighborhood $N_p$ is computed. FIG. 6B shows the next frame. FIG. 6C shows the shape prior function $p^S$ in grayscale from darkest (0.0) to brightest (1.0). More similar foreground/background color distributions result in a narrower local bandwidth and tighter shape constraint, while more different foreground/background color distributions result in a wider local bandwidth and looser shape constraint. FIG. 6D shows the foreground color probability $p^C(y)$. FIG. 6E shows the integrated shape and color foreground probability p(y).

Using p(y) as the data term, and the image gradient statistics for the neighborhood term, the current video frame t+1 may then be segmented, for example using a graph cut image segmentation algorithm. Examples are shown in FIGS. 7A-7G, 8A-8C, 9A-9C, and 10A-10E. In at least some embodiments, the user can optionally add scribbles via a user interface to correct segmentation errors towards a more accurate segmentation, which then becomes the key frame for the next frame. This process may be repeated until the whole video frame sequence is segmented. In at least some embodiments, additionally, and if necessary, the binary segmentation may be processed with a temporally-coherent matting algorithm, producing soft alpha mattes for the foreground object for high-quality compositing tasks.

Experiments and Comparisons

Embodiments of the dynamic color flow model have been tested on a variety of challenging video examples, for instance video examples containing complex color distributions (e.g., FIGS. 7A-7G and FIGS. 9A-9C), highly cluttered background (e.g., FIGS. 7A-7G and FIGS. 13A-13O), rapid topology changes (e.g., FIGS. 10A-10E), motion blur (e.g., FIGS. 7A-7G), and camera motion (e.g., FIGS. 5A-5F).

Figure 7G:
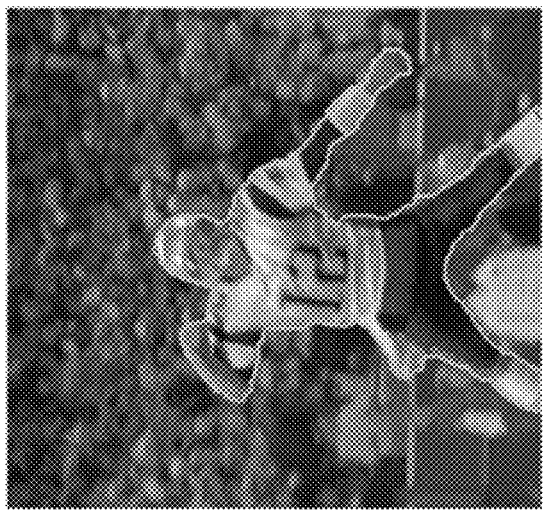
FIGS. 7A-7G illustrate propagating a segmentation from frame t to frame t+1, according to at least some embodiments.
Figure 7F:
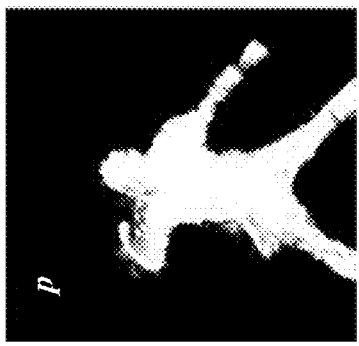
Figure 7E:
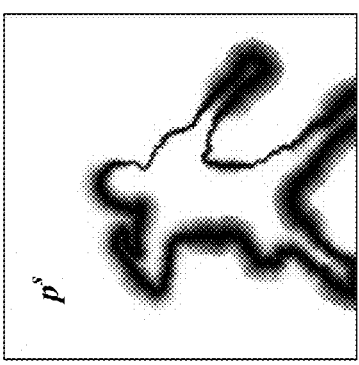
Figure 7C:
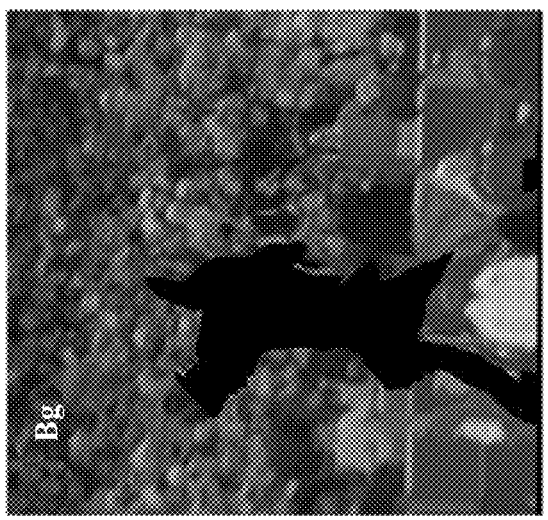
Figure 7D:
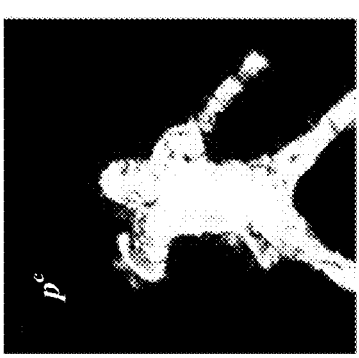
Figure 7A:
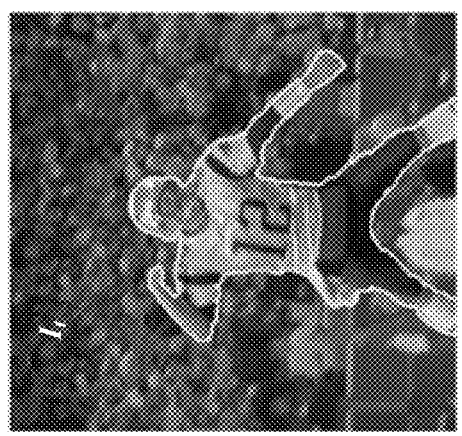
Figure 7B:

FIGS. 7A-7G illustrate propagating a segmentation from frame t to frame t+1, according to some embodiments. FIG. 7A shows a frame t with segmentation (white curve). FIG. 7B shows frame t+1. FIG. 7C shows the partially recovered background of frame t+1. FIG. 7D shows color probability $p^C(y)$ in grayscale. FIG. 7E shows the shape prior derived from frame t. FIG. 7F illustrates that incorporating the shape prior further improves the quality of the probability map p(y). FIG. 7G shows the final segmentation (gray curve) of frame t+1 without any user interactions. FIGS. 7A-7G illustrate the intermediate results of segmenting one frame. Note the background reconstruction in FIG. 7C is only partially complete. For those pixels without background reconstruction colors, some embodiments may simply sample nearby background colors for the pixels, which may provide satisfactory foreground estimation and segmentation, as shown in FIGS. 7D and 7G.

FIGS. 8A-8C, 9A-9C, and 10A-10E show additional examples of segmentation propagation on objects with diverse motion and demonstrate different motion scales. These examples demonstrate how embodiments of a video segmentation system employing the dynamic color flow model as described herein automatically adapt to these very different examples and produce accurate foreground probabilities that lead to high quality segmentation results. In FIGS. 8A-8C, the walking person moves with dynamic (non-uniform) motion. The foreground in FIGS. 9A-6C is more stable but contains very complex colors. FIGS. 10A-10E exhibit erratic motion and rapid topology changes that are very hard to track. FIGS. 8A, 9A, and 10A show the key frame t with segmentation (white curves). FIGS. 8B, 9B, and 10B show the respective computed segmentations on frames t+1 (gray curves). FIGS. 8C, 9C, and 10C show the respective probability maps in gray scale. FIGS. 10D and 10E show the segmentation propagated to a next frame t+2 (the gray curve in FIG. 10D) and the respective probability map (FIG. 10E).

FIGS. 11A through 11J and FIGS. 12A through 12J compare color probability maps and segmentation results generated by simple background subtraction, the global GMM color model, a localized color model, and an embodiment of the dynamic color flow model on two examples. FIGS. 11A and 12A show the two example frames t with segmentation indicated by the gray/white curves, and FIGS. 11B and 12B show the respective frames t+1. The gray scale images (FIGS. 11B through 11E and FIGS. 12B through 12E) are the color probabilities generated by each method followed by their corresponding segmentation results (FIGS. 11G through 11J and FIGS. 12G through 12J). For better visualization, the images are cropped from original videos. For background subtraction (FIGS. 11B and 11G and FIGS. 12B and 12G), a basic background subtraction algorithm was used, and an optimal threshold was selected for each example. Due to the rigidity assumption for the static background and the lack of accurate foreground model, the background subtraction algorithm is generally incapable of high quality segmentation tasks. The global GMM color model (FIGS. 11C and 11H and FIGS. 12C and 12H) is the least preferred in these examples, as both the foreground and background contain very similar colors. The localized color model (FIGS. 11D and 11I and FIGS. 12D and 12I), improves the color probability results by localizing the color sampling. However, errors may occur if colors are confusing even in local regions, e.g., the black color in the glasses and in the background in FIGS. 11D and 11I. The dynamic color flow model (FIGS. 11E and 11J and FIGS. 12E and 12J), generated more accurate color probabilities and segmentations for these examples than any of the conventional methods.

FIGS. 13A through 13O compare results of an interactive video object segmentation system using a localized color model (FIGS. 13A through 13E) to results of an interactive video object segmentation system using an embodiment of the dynamic color flow model as described herein (FIGS. 13F through 13J). An initial frame 1 (not shown) is pre-segmented. Segmentations for frames 2, 5, 10, 13, and 20 using each method are shown. FIGS. 13A through 13E show the segmentation (white curves) and user scribbles (striped in the foreground and dotted in the background) for the system using the localized color model. FIGS. 13F through 13J show the segmentation (white curves) and user scribbles or strokes (black in the foreground and white in the background) for the system using the dynamic color model. FIGS. 13K through 13O show the new composites generated according to the segmentations in FIGS. 13F through 13J on a white background. The system using the dynamic color model requires less user input to achieve comparable results. As the propagation progresses, the amount of interactions is further reduced using the dynamic color model due to the improved foreground and background models.

There may be some situations in video segmentation that are problematic for the dynamic color flow model. The dynamic color flow model may assume that all foreground colors on frame t+1 have been seen on frame t, and thus may not model newly appeared foreground colors correctly due to occlusion and disocclusion, such as a self-rotating colored ball where new colors constantly appear from one side of the object. Furthermore, the shape prior may only be usable when the foreground shape is consistent, and may not be applicable for relatively randomly varying objects such as fire and water. In addition, if the background is highly dynamic, such as a foreground person passing by a group of walking people, then the simple background construction methods described above may fail. In some embodiments, additional user input may be needed to improve the performance of the system. In some embodiments, other motion estimation methods and/or background reconstruction methods than those described may be used to improve the performance of the system.

Example Implementations

FIG. 14 illustrates an example video object segmentation module that may implement a video object segmentation process using a dynamic color flow modeling method, as illustrated in the above Figures. Module 900 may, for example, implement a dynamic color flow module 902 that implements a dynamic color flow modeling method, for example as illustrated in FIG. 1. FIG. 15 illustrates an example computer system on which embodiments of module 900 may be implemented. Referring to FIG. 14, module 900 receives as input a video frame sequence 920 including two or more video frames and an initial segmentation 922, for example an initial segmentation for the first frame in the video frame sequence 920. Module 900 may then apply a video object segmentation method using dynamic color flow modeling to the video frame sequence 920, for example as illustrated in FIG. 3, to generate segmentation(s) 930 for the frames in video frame sequence 920. Module 900 may receive additional user input 912 via user interface 910, for example user strokes or scribbles that indicate regions of foreground or background in a particular segmentation 930 that are incorrectly segmented. Segmentation(s) 930 may, for example, be stored to a storage medium 940, such as system memory, a disk drive, DVD, CD, etc. Segmentation(s) 930 may also, for example, be passed to additional image processing modules for further processing or to be used in various image processing techniques.

Example System

Embodiments of a video object segmentation module and/or of a dynamic color flow module as described herein may be executed on one or more computer systems, which may interact with various other devices. One such computer system is illustrated by FIG. 15. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a video object segmentation module and/or of a dynamic color flow module are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 15, memory 1020 may include program instructions 1025, configured to implement embodiments of a video object segmentation module and/or of a dynamic color flow module as described herein, and data storage 1035, comprising various data accessible by program instructions 1025. In one embodiment, program instructions 1025 may include software elements of embodiments of a video object segmentation module and/or of a dynamic color flow module as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of a video object segmentation module and/or of a dynamic color flow module as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
    obtaining a current frame and a next frame of a video frame sequence comprising a plurality of frames, and obtaining a segmentation for the current frame, the segmentation indicating a region of interest in the current frame and the region of interest including a plurality of pixels in the current frame;
    computing optical flow for the current frame relative to the next frame; and
    generating a dynamic color flow model for a region of interest in the next frame comprising:
        for each pixel in the region of interest in the current frame:
            determining a motion vector for the pixel relative to the next frame by computing the motion vector as a locally averaged optical flow for the pixel, the motion vector indicating a predicted location for the pixel in the next frame;
            generating a local probability map for the pixel in the next frame centered at the predicted location and in which variance of the local probability map is determined according to magnitude of the respective motion vector;
            determining variance of the local probability map according to magnitude of the respective motion vector in which a higher magnitude of the motion vector results in a larger window for the respective local probability map, and a smaller magnitude of the motion vector results in a smaller window for the respective local probability map; and
        propagating colors from the pixels in the region of interest in the current frame to pixels in the next frame according to the generated local probability maps.

2. The method as recited in claim 1, wherein each local probability map is a Gaussian distribution function.

3. The method as recited in claim 1, where at least one affected pixel in the dynamic color flow model receives color contributions from two or more pixels in the current frame according to the probabilistic distribution of the respective local probability maps.

4. The method as recited in claim 1, where at least one pixel in the current frame contributes color to two or more pixels in the dynamic color flow model according to the probabilistic distribution of the respective local probability maps.

5. The method as recited in claim 1, wherein the region of interest is a foreground of the current frame, wherein the dynamic color flow model is a dynamic color flow model for the foreground in the next frame, and wherein the segmentation further indicates a background of the current frame, the method further comprising:
    generating a dynamic color flow model for the background in the next frame;
    constructing a global color probability map for the next frame according to the dynamic color flow model for the foreground in the next frame and the dynamic color flow model for the background in the next frame; and applying a segmentation technique to generate a segmentation for the next frame according to the global color probability map.

6. The method as recited in claim 5, further comprising applying a background reconstruction technique to the plurality of frames in the video frame sequence to reconstruct a background for the next frame.

7. The method as recited in claim 5, wherein, in said generating a dynamic color flow model for the background in the next frame, a same value is assigned to the variance of the local probability map at each pixel of the background.

8. The method as recited in claim 5, wherein, in said generating a dynamic color flow model for the background in the next frame, the variance of the local probability map is dynamically computed at each pixel of the background according to the respective motion vector.

9. The method as recited in claim 5, further comprising deriving a shape prior from the global color probability map, wherein the shape prior is used by the segmentation technique to constrain the segmentation for the next frame.

10. A system, comprising:
at least one processor; and
a memory comprising program instructions, wherein the program instructions are executable by the at least one processor to:
obtain a current frame and a next frame of a video frame sequence comprising a plurality of frames, and obtain a segmentation for the current frame, the segmentation indicating a region of interest in the current frame and the region of interest including a plurality of pixels in the current frame;
computing optical flow for the current frame relative to the next frame; and
generate a dynamic color flow model for a region of interest in the next frame comprising:
for each pixel in the region of interest in the current frame:
determine a motion vector for the pixel relative to the next frame by computing the motion vector as a locally averaged optical flow for the pixel, the motion vector indicating a predicted location for the pixel in the next frame;
generate a local probability map for the pixel in the next frame centered at the predicted location and in which variance of the local probability map is determined according to magnitude of the respective motion vector;
determine variance of the local probability map according to magnitude of the respective motion vector in which a higher magnitude of the motion vector results in a larger window for the respective local probability map, and a smaller magnitude of the motion vector results in a smaller window for the respective local probability map; and
propagate colors from the pixels in the region of interest in the current frame to pixels in the next frame according to the generated local probability maps.

11. The system as recited in claim 10, wherein the region of interest is a foreground of the current frame, wherein the dynamic color flow model is a dynamic color flow model for the foreground in the next frame, wherein the segmentation further indicates a background of the current frame, and wherein the program instructions are executable by the at least one processor to:
generate a dynamic color flow model for the background in the next frame;
construct a global color probability map for the next frame according to the dynamic color flow model for the foreground in the next frame and the dynamic color flow model for the background in the next frame; and
apply a segmentation technique to generate a segmentation for the next frame according to the global color probability map.

12. The system as recited in claim 11, wherein the program instructions are executable by the at least one processor to apply a background reconstruction technique to the plurality of frames in the video frame sequence to reconstruct a background for the next frame.

13. The system as recited in claim 11, wherein the program instructions are executable by the at least one processor to derive a shape prior from the global color probability map, wherein the shape prior is used by the segmentation technique to constrain the segmentation for the next frame.

14. A computer-readable storage device storing program instructions that are computer-executable to perform operations comprising:
obtaining a current frame and a next frame of a video frame sequence comprising a plurality of frames, and obtaining a segmentation for the current frame, the segmentation indicating a region of interest in the current frame and the region of interest including a plurality of pixels in the current frame;
computing optical flow for the current frame relative to the next frame; and
generating a dynamic color flow model for a region of interest in the next frame comprising:
for each pixel in the region of interest in the current frame:
determining a motion vector for the pixel relative to the next frame by computing the motion vector as a locally averaged optical flow for the pixel, the motion vector indicating a predicted location for the pixel in the next frame;
generating a local probability map for the pixel in the next frame centered at the predicted location and in which variance of the local probability map is determined according to magnitude of the respective motion vector;
determining variance of the local probability map according to magnitude of the respective motion vector in which a higher magnitude of the motion vector results in a larger window for the respective local probability map, and a smaller magnitude of the motion vector results in a smaller window for the respective local probability map; and
propagating colors from the pixels in the region of interest in the current frame to pixels in the next frame according to the generated local probability maps.

15. The computer-readable storage device as recited in claim 14, wherein the region of interest is a foreground of the current frame, wherein the dynamic color flow model is a dynamic color flow model for the foreground in the next frame, wherein the segmentation further indicates a background of the current frame, and wherein the program instructions are further computer-executable to implement:
generating a dynamic color flow model for the background in the next frame;
constructing a global color probability map for the next frame according to the dynamic color flow model for the foreground in the next frame and the dynamic color flow model for the background in the next frame; and applying a segmentation technique to generate a segmentation for the next frame according to the global color probability map.

16. The computer-readable storage device as recited in claim 15, wherein the program instructions are further computer-executable to implement deriving a shape prior from the global color probability map, wherein the shape prior is used by the segmentation technique to constrain the segmentation for the next frame.

\* \* \* \* \*